US011047302B2

(12) United States Patent
Kubo et al.

(10) Patent No.: US 11,047,302 B2
(45) Date of Patent: Jun. 29, 2021

(54) COMPRESSED AIR ENERGY STORAGE POWER GENERATION APPARATUS

(71) Applicant: Kobe Steel, Ltd., Hyogo (JP)

(72) Inventors: Yohei Kubo, Kobe (JP); Masatake Toshima, Kobe (JP); Hiroki Saruta, Takasago (JP); Masaki Matsukuma, Takasago (JP); Kanami Sakamoto, Takasago (JP)

(73) Assignee: Kobe Steel, Ltd., Hyogo (JP)

( * ) Notice: Subject to any disclaimer, the term of this patent is extended or adjusted under 35 U.S.C. 154(b) by 139 days.

(21) Appl. No.: 16/080,625

(22) PCT Filed: Feb. 10, 2017

(86) PCT No.: PCT/JP2017/004904
§ 371 (c)(1),
(2) Date: Aug. 28, 2018

(87) PCT Pub. No.: WO2017/159149
PCT Pub. Date: Sep. 21, 2017

(65) Prior Publication Data
US 2019/0072032 A1    Mar. 7, 2019

(30) Foreign Application Priority Data

Mar. 18, 2016   (JP) .............................. JP2016-055641

(51) Int. Cl.
*F02C 6/16*   (2006.01)
*F02C 7/10*   (2006.01)
(Continued)

(52) U.S. Cl.
CPC ................. *F02C 6/16* (2013.01); *F02C 1/04* (2013.01); *F02C 6/18* (2013.01); *F02C 7/08* (2013.01);
(Continued)

(58) Field of Classification Search
CPC ... F02C 6/14; F02C 6/16; Y02E 60/15; Y02E 60/14; Y02E 60/16
See application file for complete search history.

(56) References Cited

U.S. PATENT DOCUMENTS 4,765,142 A * 8/1988 Nakhamkin .......... F01K 21/047
60/652
5,495,709 A * 3/1996 Frutschi ................ F01K 21/047
60/39.55
(Continued)

FOREIGN PATENT DOCUMENTS

CN        102 518 480 A      6/2012
CN           103114971 A  *  5/2013
(Continued)

OTHER PUBLICATIONS

International Preliminary Report on Patentability issued in corresponding International Application No. PCT/JP2017/004904; dated Sep. 27, 2018; with English translation.
(Continued)

*Primary Examiner* — Laert Dounis
(74) *Attorney, Agent, or Firm* — Studebaker & Brackett PC

(57) ABSTRACT

A compressed air energy storage (CAES) power generation apparatus includes a motor driven by renewable energy, a compressor driven by the motor, a pressure accumulating tank storing compressed air compressed by the compressor, an expander driven by the compressed air from the pressure accumulating tank, and a generator connected to the expander. The apparatus includes a first heat exchanger that performs heat exchange between the compressed air from the compressor to the pressure accumulating tank and a heat medium, cools the compressed air, and heats the heat medium, a heat accumulating tank that stores the heat medium heated by the first heat exchanger, a second heat
(Continued)

exchanger that performs heat exchange between the compressed air from the pressure accumulating tank to the expander, heats the compressed air, and cools the heat medium, and third heat exchangers that perform heat exchange between the exhaust heat outside a system and a fluid in the system. The power generation efficiency of the apparatus is improved using the exhaust heat outside the system while the exhaust heat outside the system is cooled using the cold heat generated in the system of the apparatus.

4 Claims, 11 Drawing Sheets

(51) Int. Cl.
    *F02C 7/143*    (2006.01)
    *F02C 6/18*    (2006.01)
    *F02C 7/08*    (2006.01)
    *F03D 9/17*    (2016.01)
    *F02C 1/04*    (2006.01)

(52) U.S. Cl.
    CPC .............. *F02C 7/10* (2013.01); *F02C 7/143* (2013.01); *F03D 9/17* (2016.05); *F05D 2220/60* (2013.01); *F05D 2260/211* (2013.01); *F05D 2260/213* (2013.01); *F05D 2260/42* (2013.01); *Y02E 60/14* (2013.01); *Y02E 60/16* (2013.01); *Y02E 70/30* (2013.01)

(56) References Cited

U.S. PATENT DOCUMENTS

| | | | | |
|---|---|---|---|---|
| 5,537,822 A | * | 7/1996 | Shnaid | F02C 6/04 |
| | | | | 60/650 |
| 2001/0004830 A1 | | 6/2001 | Wakana et al. | |
| 2011/0094229 A1 | * | 4/2011 | Freund | F02C 6/14 |
| | | | | 60/727 |
| 2011/0094231 A1 | | 4/2011 | Freunf | |
| 2011/0094236 A1 | | 4/2011 | Finkenrath et al. | |
| 2011/0100010 A1 | * | 5/2011 | Freund | F02C 1/005 |
| | | | | 60/659 |
| 2012/0036653 A1 | | 2/2012 | Kidd et al. | |
| 2012/0036853 A1 | | 2/2012 | Kidd et al. | |
| 2012/0060501 A1 | | 3/2012 | Hemrle et al. | |
| 2014/0102073 A1 | * | 4/2014 | Pang | F01K 3/00 |
| | | | | 60/39.182 |
| 2015/0000248 A1 | * | 1/2015 | del Omo | F01K 23/10 |
| | | | | 60/39.182 |
| 2015/0113940 A1 | | 4/2015 | Sinatov et al. | |
| 2015/0260463 A1 | * | 9/2015 | Laughlin | F24S 60/00 |
| | | | | 165/10 |
| 2016/0230700 A1 | | 8/2016 | Yamasaki et al. | |
| 2017/0058768 A1 | * | 3/2017 | Bergins | F01K 7/16 |

FOREIGN PATENT DOCUMENTS

| | | | | |
|---|---|---|---|---|
| CN | 103291557 A | * | 9/2013 | |
| JP | H10-238366 A | | 9/1998 | |
| JP | 2012-523815 A | | 10/2012 | |
| JP | 2013-509528 A | | 3/2013 | |
| JP | 2013-509530 A | | 3/2013 | |
| JP | 2013-536357 A | | 9/2013 | |
| JP | 5563176 B1 | | 7/2014 | |
| WO | WO-2010125568 A2 | * | 11/2010 | ............... F03D 9/17 |
| WO | 2011/053411 A1 | | 5/2011 | |
| WO | WO-2011053411 A1 | * | 5/2011 | ............... F02C 6/16 |
| WO | 2014/159525 A1 | | 10/2014 | |

OTHER PUBLICATIONS

The extended European search report issued by the European Patent Office on Oct. 11, 2019, which corresponds to European Patent Application No. 17766157.6 and is related to U.S. Appl. No. 16/080,625.

International Search Report issued in PCT/JP2017/004904, dated Mar. 7, 2017.

* cited by examiner

COMPRESSED AIR ENERGY STORAGE POWER GENERATION APPARATUS

CROSS-REFERENCE TO RELATED APPLICATIONS

This is a national phase application in the United States of International Patent Application No. PCT/JP2017/004904 with an international filing date of Feb. 10, 2017, which claims priority of Japanese Patent Application No. 2016-055641 filed on Mar. 18, 2016 the contents of which are incorporated herein by reference.

TECHNICAL FIELD

The present invention relates to a compressed air energy storage power generation apparatus.

BACKGROUND ART

In power generation, such as wind power generation and solar power generation, in which renewable energy is used, power output may fluctuate to become unstable because the power generation depends on a weather conditions. A compressed air energy storage (CAES) system is known as a system that levels the output for the output fluctuation.

In a compressed air energy storage (CAES) power generation apparatus in which the CAES system is used, electric energy is stored as compressed air during a off-peak time of a power plant, an expander is driven by the compressed air during a high-power demand time to operate a generator, and the electrical energy is generated to level the output. A system, in which compression heat is recovered in a heat accumulating medium and stored in a heat accumulating tank or the like, and the compressed air before expansion is heated using the recovered compression heat, is known in order to improve power generation efficiency. Consequently, a power increase is prevented during compression, and heat dissipation is prevented during storage of the compressed air in a pressure accumulating tank at the same time as recovery power is increased during the expansion.

As the CAES power generation apparatus, for example, JP 2013-509530 A discloses a CAES power generation apparatus in which a heat energy storage system is used.

Although it is different from the CAES power generation apparatus, for example, JP 5563176 B discloses an exhaust heat recovery apparatus that can obtain hot water or the like by effectively using exhaust heat outside the system such as exhaust heat of an engine.

SUMMARY OF THE INVENTION

Problems to be Solved by the Invention

In JP 2013-509530 A, the improvement of the power generation efficiency of the CAES power generation apparatus using the exhaust heat outside the system is not considered. In JP 5563176 B, the reduction of the exhaust heat outside the system using the cold heat generated in the system is not considered.

An object of the present invention is to improve the power generation efficiency of the CAES power generation apparatus using the exhaust heat outside the system while cooling the exhaust heat outside the system using the cold heat generated in the system of the CAES power generation apparatus.

Means for Solving the Problems

According to one aspect of the present invention, a compressed air energy storage power generation apparatus includes: an electric motor driven by power generated by renewable energy; a compressor driven by the electric motor to compress air; a pressure accumulator that stores the compressed air compressed by the compressor: an expander driven by the compressed air supplied from the accumulator; a generator mechanically connected to the expander; a first heat exchanger that performs heat exchange between the compressed air supplied from the compressor to the pressure accumulator and a heat medium, cools the compressed air, and heats the heat medium; a heat accumulator that stores the heat medium heated by the first heat exchanger; a second heat exchanger that performs heat exchange between the compressed air supplied from the pressure accumulator to the expander and the heat medium, heats the compressed air, and cools the heat medium; and a third heat exchanger that performs heat exchange between exhaust heat outside a system and a fluid in the system.

According to this configuration, the exhaust heat outside the system can be cooled using the cold heat generated in the system of the CAES power generation apparatus. Additionally, the power generation efficiency of the CAES power generation apparatus can be improved by heating the compressed air in an expansion stage using the exhaust heat outside the system. Specifically, the exhaust heat outside the system is cooled by using the cold heat generated in the system of the CAES power generation apparatus in the third heat exchanger, so that energy efficiency is improved as a whole by effectively using the cold energy in the system. In particular, in the cooling of the exhaust heat, a temperature of the exhaust heat preferably lowered less than or equal to an exhaust heat reference temperature using a temperature sensor or the like. The exhaust heat reference temperature is determined by a law, and is an upper limit value of the temperature of the exhaust heat that can be discharged to the outside air. The compressed air supplied to the expander by the exhaust heat outside the system is directly or indirectly heated by the third heat exchanger, so that the power generation efficiency of the generator is improved. The compression heat is recovered from the compressed air to the heat medium by the first heat exchanger, so that the temperature of the compressed air supplied to the pressure accumulator is lowered to prevent a heat energy loss due to the heat radiation in the pressure accumulator. The heat medium in which the temperature is raised by recovering the compression heat is stored in the heat accumulator, and the compressed air before expansion is heated by the second heat exchanger by using the heat medium in which the temperature is raised so that operation efficiency is improved in the expander to improve the power generation efficiency.

Preferably, the third heat exchanger performs heat exchange between the exhaust heat outside the system and the heat medium supplied from the first heat exchanger to the heat accumulator, cools the exhaust heat, and heats the heat medium.

According to this configuration, in the third heat exchanger, the heat medium heated by the first heat exchanger can be further heated, and the higher-temperature heat medium can be stored in the heat accumulator. This configuration is effective in the case that the exhaust heat outside the system is higher than the heat medium heated by the first heat exchanger.

Preferably, the third heat exchanger performs heat exchange between the exhaust heat outside the system and the heat medium supplied from the heat accumulator to the second heat exchanger, cools the exhaust heat, and heats the heat medium.

According to this configuration, in the third heat exchanger, the heat medium heated by the second heat exchanger can be preheated, and a heating load of the heat medium in the second heat exchanger can be reduced. This configuration is effective in the case that the exhaust heat outside the system is higher than the heat medium supplied to the second heat exchanger.

Preferably, the third heat exchanger performs heat exchange between the exhaust heat outside the system and the heat medium supplied to the heat accumulator without passing through the first heat exchanger, cools the exhaust heat outside the system, and heats the heat medium.

According to this configuration, in the third heat exchanger, the heat medium supplied to the heat accumulator can be heated in parallel with the heating of the heat medium in the first heat exchanger, and to the more heat medium can be accumulated in the heat accumulator. This configuration is effective in the case that the exhaust heat outside the system is higher than the heat medium supplied to the first heat exchanger.

Preferably, the third heat exchanger performs heat exchange between the exhaust heat outside the system and the compressed air supplied from the pressure accumulator to the expander, cools the exhaust heat outside the system, and heat the compressed air.

According to this configuration, in the third heat exchanger, the compressed air before expansion can directly be heated using the exhaust heat with no use of the heat medium or the like. This configuration is effective in the case that the exhaust heat outside the system is higher than the compressed air supplied to the expander.

Preferably, the third heat exchanger performs heat exchange between the exhaust heat outside the system and the air discharged from the expander, cools the exhaust heat outside the system, and heats the air.

According to this configuration, in the third heat exchanger, the exhaust heat outside the system can be cooled using the cold heat of the air discharged from the expander. The temperature of the air exhausted from the expander is lowered by heat absorption during the expansion, and the energy efficiency of the system can be improved by effectively using the cold heat of the exhausted air.

Preferably, the third heat exchanger performs heat exchange between the exhaust heat outside the system and the heat medium supplied from the second heat exchanger, cools the exhaust heat outside the system, and heats the heat medium.

According to this configuration, in the third heat exchanger, the exhaust heat outside the system can be cooled using the heat medium cooled by the second heat exchanger. Additionally, the energy efficiency of the system can be improved by effectively using the heat medium cooled by the second heat exchanger.

According to the present invention, the power generation efficiency of the CAES power generation apparatus can be improved using the exhaust heat outside the system while the exhaust heat outside the system is cooled using the cold heat generated in the system of the CAES power generation apparatus.

DESCRIPTION OF EMBODIMENTS

Hereinafter, embodiments of the present invention will be described with reference to the accompanying drawings.

First Embodiment

A compressed air energy storage (CAES) power generation apparatus 2 levels output fluctuation of a power generation device 4, which generates power by using renewable energy, to supply the power to a power system 6, and supplies the power according to fluctuation of power demand in the power system 6.

Figure 1:
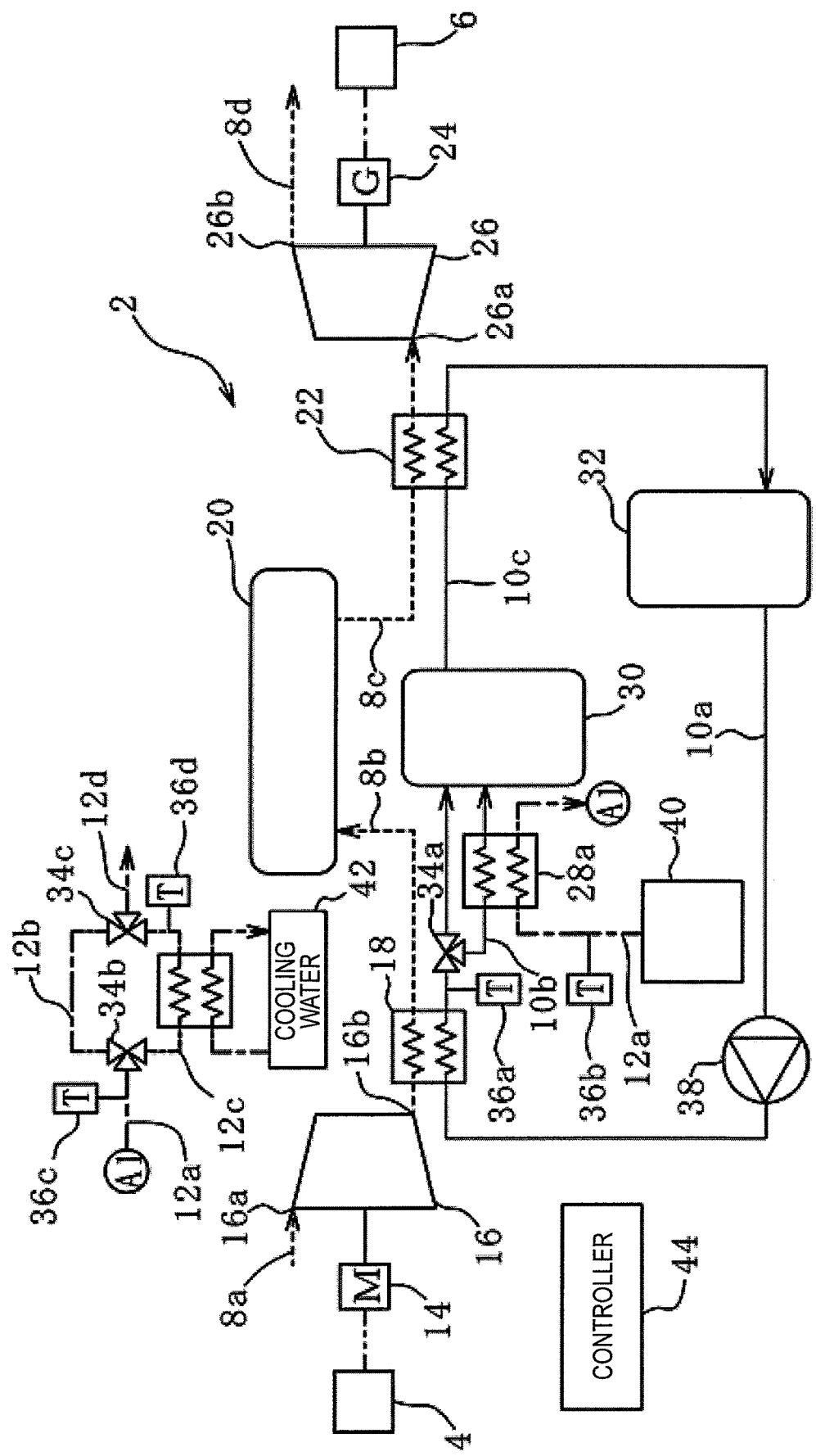
FIG. 1 is a schematic configuration diagram illustrating a compressed air energy storage power generation apparatus according to a first embodiment of the present invention.

A configuration of the CAES power generation apparatus 2 will be described with reference to FIG. 1. The CAES power generation apparatus 2 of the first embodiment includes air passages 8a to 8d (illustrated by a broken line), heat medium passages 10a to 10c (illustrated by a solid line), and exhaust heat passages 12a to 12d (indicated by a one-dot chain line).

(Air Passage)

A compressor 16 driven by a motor (electric motor) 14, a first heat exchanger 18, a pressure accumulating tank (pressure accumulator) 20, a second heat exchanger 22, and an expander 26 that drives a generator 24 are sequentially provided in the air passages 8a to 8d.

The power generation device 4 in which the renewable energy is used is electrically connected to the motor 14 (indicated by a two-dot chain line). The power generated by the power generation device 4 is supplied to the motor 14. The motor 14 is mechanically connected to the compressor 16, and the compressor 16 is driven in association with drive of the motor 14.

When being driven by the motor 14, the compressor 16 sucks air from an inlet port 16a through the air passage 8a, compresses the air in the compressor 16, and discharges the compressed air from a discharge port 16b. The discharge port 16b of the compressor 16 is fluidly connected to the pressure accumulating tank 20 through the air passage 8b, and the compressed air discharged from the discharge port 16b is pressure-fed to the pressure accumulating tank 20 through the air passage 8b. A type of the compressor 16 is not particularly limited. For example, a screw type, a scroll type, a turbo type, and a reciprocating type may be used.

The compressed air discharged from the discharge port 16b of the compressor 16 becomes a high temperature due to the compression heat generated during the compression, so that the compressed air is preferably cooled before supplied to the pressure accumulating tank 20. Thus, the first heat exchanger 18 is interposed in the air passage 8b. In the first heat exchanger 18, by heat exchange between a heat medium and the compressed air, the compressed air is cooled and the heat medium is heated. Because the compression heat is recovered from the compressed air to the heat medium by the first heat exchanger 18 in this manner, the temperature of the compressed air supplied to the pressure accumulating tank 20 falls, and the compressed air is prevented from radiating heat to lose heat energy while the compressed air is stored in the pressure accumulating tank 20.

The pressure accumulating tank 20 can store the compressed air, and accumulate the compressed air as energy. The pressure accumulating tank 20 is fluidly connected to an air supply port 26a of the expander 26 through the air passage 8c, and the compressed air sent out from the pressure accumulating tank 20 is supplied to the expander 26 through the air passage 8c.

In the expander 26, a temperature of the air falls due to heat absorption during expansion. Consequently, the compressed air supplied to the expander 26 is preferably high temperature. Thus, the second heat exchanger 22 is interposed in the air passage 8c. In the second heat exchanger 22, the compressed air is heated by the heat exchange between the heat medium and the compressed air, and the heat medium is cooled.

The expander 26 is mechanically connected to the generator 24, the compressed air is supplied from the air supply port 26a, and the expander 26 is operated by the supplied compressed air to drive the generator 24. The generator 24 is electrically connected to the power system 6 (indicated by a two-dot chain line), and the power generated by the generator 24 is supplied to the power system 6. The air expanded by the expander 26 is exhausted from an exhaust port 26b through the air passage 8d. For example, a screw type, a scroll type, a turbo type, and a reciprocating type may be used as the expander 26.

(Heat Medium Passage)

The first heat exchanger 18, a third heat exchanger 28a, a high-temperature heat accumulating tank (heat accumulator) 30, the second heat exchanger 22, and a low-temperature heat accumulating tank 32 are sequentially provided in the heat medium passages 10a to 10c. The heat medium circulates and flows among the first heat exchanger 18, the third heat exchanger 28a, the high-temperature heat accumulating tank 30, the second heat exchanger 22, and the low-temperature heat accumulating tank 32. A type of the heat medium is not particularly limited. For example, a mineral oil type or a glycol type may be used as the heat medium.

In the first heat exchanger 18, the heat exchange is performed between the compressed air in the air passage 8b extending from the compressor 16 to the pressure accumulating tank 20 and the heat medium in the heat medium passage 10a extending from the low-temperature heat accumulating tank 32 to the high-temperature heat accumulating tank 30. Specifically, the compressed air flowing in the air passage 8b becomes a high temperature due to the compression heat generated during the compression of the compressor 16, and the compressed air is cooled by the heat exchange using the first heat exchanger 18. That is, in the first heat exchanger 18, the temperature of the compressed air falls and the temperature of the heat medium rises. The first heat exchanger 18 is fluidly connected to the high-temperature heat accumulating tank 30 through the heat medium passages 10a, 10b, and the heat medium in which the temperature rises is supplied to and stored in the high-temperature heat accumulating tank 30. A three-way valve 34a is provided in the heat medium passages 10a, 10b, and one of the heat medium passages 10a, 10b through which the heat medium flows can be selected by the three-way valve 34a.

A temperature sensor 36a that measures the temperature of the heat medium is provided in the heat medium passage 10a extending from the first heat exchanger 18 to the three-way valve 34a. The temperature of the heat medium measured by the temperature sensor 36a is output to a controller 44 to be described later.

The third heat exchanger 28a is provided in the heat medium passage 10b of the heat medium passages 10a, 10b. In the third heat exchanger 28a, the heat exchange is performed between the heat medium and the exhaust heat, the heat medium is heated, and the exhaust heat is cooled.

The high temperature heat accumulating tank 30 heats and stores the high-temperature heat medium supplied from the first heat exchanger 18 or the third heat exchanger 28a. Consequently, preferably the high-temperature heat accumulating tank 30 is thermally insulated. The high-temperature heat accumulating tank 30 is fluidly connected to the second heat exchanger 22 through the heat medium passage 10c, and the heat medium stored in the high-temperature heat accumulating tank 30 is supplied to the second heat exchanger 22 through the heat medium passage 10c.

In the second heat exchanger 22, the heat exchange is performed between the compressed air in the air passage 8c extending from the pressure accumulating tank 20 to the expander 26 and the heat medium in the heat medium passage 10c extending from the high-temperature heat accumulating tank 30 to the low-temperature heat accumulating tank 32. Specifically, the temperature of the compressed air is raised before the expansion is performed by the expander 26 using the high-temperature heat medium in the high-temperature heat accumulating tank 30, thereby improving power generation efficiency. That is, in the second heat exchanger 22, the temperature of the compressed air rises and the temperature of the heat medium falls. The compressed heat is recovered to store in the high-temperature heat accumulating tank 30 the heat medium in which the temperature rises, and the compressed air before expansion is heated by the second heat exchanger 22 using the heat medium in which the temperature rises, so that the power generation efficiency is improved. The second heat exchanger 22 is fluidly connected to the low-temperature heat accumulating tank 32 through the heat medium passage 10c, and the heat medium in which the temperature falls is supplied to and stored in the low-temperature heat accumulating tank 32 through the heat medium passage 10c.

The low-temperature heat accumulating tank 32 stores the low-temperature heat medium supplied from the second heat exchanger 22. The low-temperature heat accumulating tank 32 is fluidly connected to the first heat exchanger 18 through the heat medium passage 10a, and the heat medium stored in the low-temperature heat accumulating tank 32 is supplied to the first heat exchanger 18 through the heat medium passage 10a.

In this manner, the heat medium circulates in the heat medium passages 10a to 10c. The circulation of the heat medium is performed by a pump 38 interposed in the heat medium passage 10a. In the first embodiment, the pump 38 is provided on a downstream side of the low-temperature heat accumulating tank 32, but a position of the pump 38 is not particularly limited.

(Exhaust Heat Passage)

An exhaust heat source 40, the third heat exchanger 28a, and a cooling tower 42 are sequentially provided in the exhaust heat passages 12a to 12d.

The exhaust heat source 40 is a device that generates a high-temperature gas (exhaust heat). For example, the exhaust heat source 40 is an engine or a boiler. The exhaust heat source 40 communicates with outside air through the exhaust heat passages 12a to 12d, and the high-temperature gas generated in the exhaust heat source 40 is discharged to the outside air through the exhaust heat passages 12a to 12d. In the first embodiment, the exhaust heat is discharged from the exhaust heat source 40 in a form of the high-temperature gas. However, the exhaust heat is not limited to the gas but may be any fluid.

The exhaust heat passage 12a extending from the exhaust heat source 40 is branched into two exhaust heat passages 12b, 12c through a three-way valve 34b. The two branched exhaust heat passages 12b, 12c merge into the exhaust heat passage 12d through the three-way valve 34c. A cooling tower 42 that cools the gas in the exhaust heat passage 12c is provided in the exhaust heat passage 12c of the two exhaust heat passages 12b, 12c. The cooling tower 42 of the first embodiment is a heat exchange type in which the cooling water is used, but the cooling tower 42 is not particularly limited thereto.

A temperature sensor 36b that measures the temperature of the gas is provided in the exhaust heat passage 12a extending from the exhaust heat source 40 to the third heat exchanger 28a. The temperature of the gas measured by the temperature sensor 36b is output to the controller 44 to be described later.

In the third heat exchanger 28a, the heat exchange is performed between the heat medium in the heat medium passage 10b extending from the first heat exchanger 18 to the high-temperature heat accumulating tank 30 and the gas in the exhaust heat passage 12a. Specifically, the heat medium in the heat medium passage 10b is heated using the high-temperature gas in the exhaust heat passage 12a, the heat medium being supplied to the high-temperature heat accumulating tank 30. That is, in the third heat exchanger 28a, the temperature of the gas falls and the temperature of the heat medium rises.

A temperature sensor 36c that measure the temperature of the gas is provided in the exhaust heat passage 12a extending from the third heat exchanger 28a to the three-way valve 34b. A temperature sensor 36d that measures the temperature of the gas is provided in the exhaust heat passage 12c extending from the cooling tower 42 to the three-way valve 34c. The temperatures of the gas measured by the temperature sensors 36a to 36d are output to the controller 44 to be described later.

(Control Method)

The CAES power generation apparatus 2 includes the controller 44. The controller 44 receives temperature values measured by the temperature sensors 36a to 36d, and controls the three-way valves 34a to 34c based on the temperature values.

In the case that a temperature Tg1 of the gas (exhaust heat) measured by the temperature sensor 36b is higher than a temperature Th1 of the heat medium measured by the temperature sensor 36a, the controller 44 controls the three-way valve 34a, causes the heat medium to flow in the heat medium passage 10b, and performs the heat exchange using the third heat exchanger 28a. In the case that the temperature Tg1 is lower than or equal to the temperature Th1, the controller 44 controls the three-way valve 34a, does not cause the heat medium to flow in the heat medium passage 10b, and does not perform the heat exchange using the third heat exchanger 28a. Thus, the temperature of the heat medium supplied to the high-temperature heat accumulating tank 30 can be raised or maintained.

In the case that a temperature Tg2 of the gas measured by the temperature sensor 36c is higher than an exhaust heat reference temperature Tth, the controller 44 controls the three-way valve 34b, causes the gas to flow in the exhaust heat passage 12c, and cools the gas using the cooling tower 42. The exhaust heat reference temperature Tth is determined by a law, and is an upper limit value of the temperature of the exhaust heat that can be discharged to the outside air. In the case that a temperature Tg3 of the gas measured by the temperature sensor 36d is still higher than the exhaust heat reference temperature Tth after the cooling, the controller 44 controls the three-way valves 34b, 34c, causes the gas to repeatedly flow in the exhaust heat passages 12b, 12c, and repeatedly cools the gas using the cooling tower 42 until temperature Tg3 of the gas becomes lower than or equal to the exhaust heat reference temperature Tth. In the case that the temperature Tg3 of the gas becomes lower than or equal to the exhaust heat reference temperature Tth by the cooling, the controller 44 controls the three-way valve 34c to discharge the gas to the outside air through the exhaust heat passage 12d. In the case that the temperature Tg2 of the gas measured by the temperature sensor 36c is already lower than or equal to the exhaust heat reference temperature Tth, the controller 44 controls the three-way valves 34b, 34c, causes the gas to flow in the exhaust heat passages 12b, 12d, and discharges the gas to the outside air without cooling the gas using the cooling tower 42.

As described above, in the first embodiment, the heat medium heated by the first heat exchanger 18 can further be heated by the third heat exchanger 28a, and the higher-temperature heat medium can be stored in the high-temperature heat accumulating tank 30. As described above, this configuration is effective in the case that the exhaust heat from the exhaust heat source 40 outside the system is higher than the heat medium heated by the first heat exchanger 18.

Second Embodiment

Figure 2:
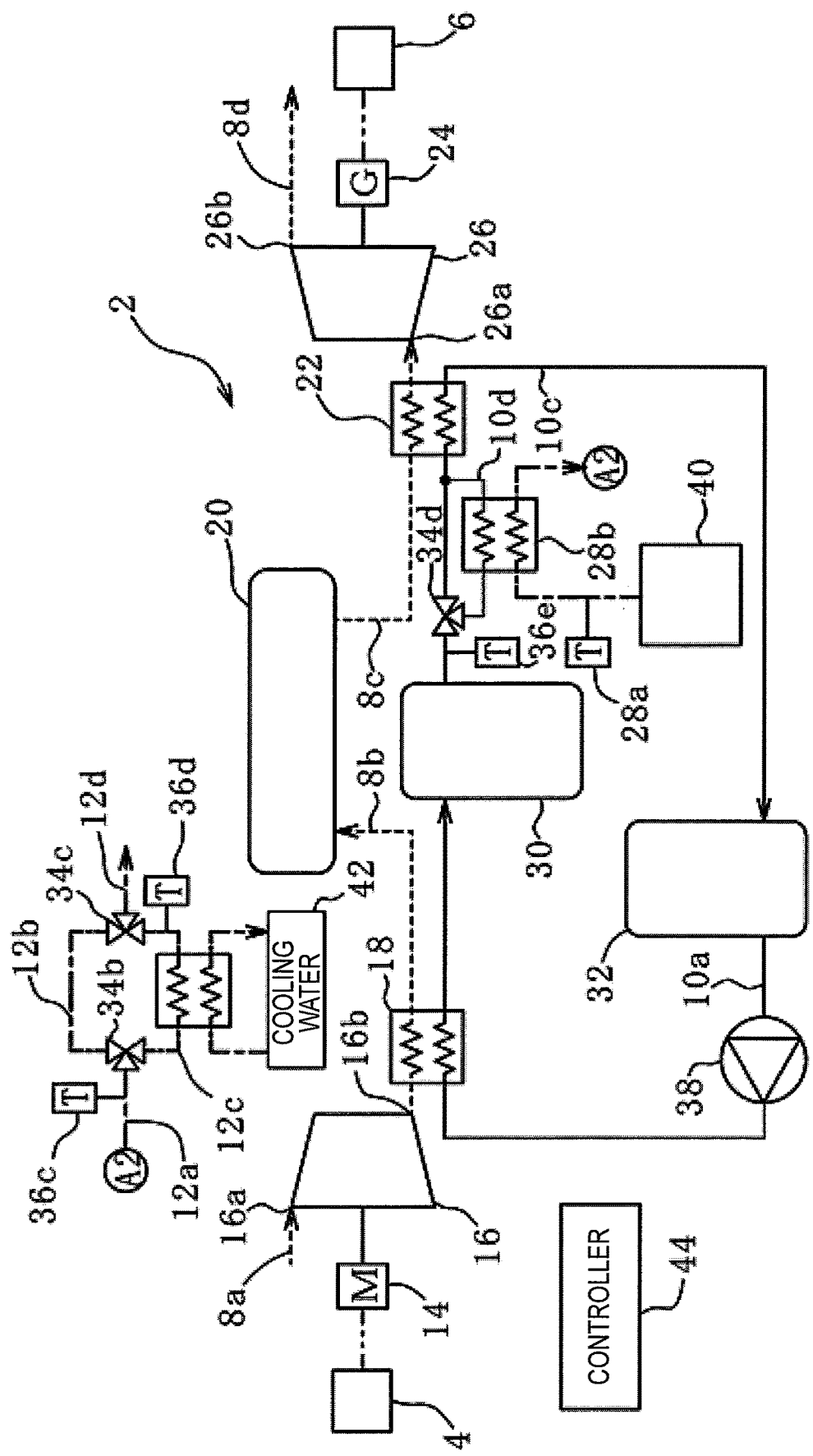
FIG. 2 is a schematic configuration diagram illustrating a compressed air energy storage power generation apparatus according to a second embodiment of the present invention.

In a CAES power generation apparatus 2 according to a second embodiment in FIG. 2, disposition of a third heat exchanger 28b is changed. The second embodiment is substantially similar to the first embodiment in FIG. 1 except for this point. Thus, the description of the component similar to that in FIG. 1 will be omitted.

In the second embodiment, the heat medium passage 10d is branched from the heat medium passage 10c extending from the high-temperature heat accumulating tank 30 to the second heat exchanger 22. A three-way valve 34d is provided at a branch point, and one of the heat medium passages 10c, 10d through which the heat medium flows can be selected by the three-way valve 34d. The branched heat medium passage 10d merges in the heat medium passage 10c on an upstream side of the second heat exchanger 22.

A temperature sensor 36e that measures the temperature of the heat medium is provided in the heat medium passage 10c extending from the high-temperature heat accumulating tank 30 to the three-way valve 34d. The temperature of the heat medium measured by the temperature sensor 36e is output to the controller 44.

The third heat exchanger 28b is interposed in the heat medium passage 10d. In the third heat exchanger 28b, the heat exchange is performed between the heat medium in the heat medium passage 10d and the gas in the exhaust heat passage 12a. Specifically, the heat medium in the heat medium passage 10d is heated using the high-temperature gas in the exhaust heat passage 12a, the heat medium being supplied to the second heat exchanger 22. That is, in the third heat exchanger 28b, the temperature of the gas falls and the temperature of the heat medium rises.

In the case that the temperature Tg1 of the gas (exhaust heat) measured by the temperature sensor 36b is higher than a temperature Th2 of the heat medium measured by the temperature sensor 36e, the controller 44 controls the three-way valve 34d, causes the heat medium to flow in the heat medium passage 10d, and performs the heat exchange using the third heat exchanger 28b. In the case that the temperature Tg1 of the gas is lower than or equal to the temperature Th2 of the heat medium, the controller 44 controls the three-way valve 34d, does not cause the heat medium to flow in the heat medium passage 10d, and does not perform the heat exchange using the third heat exchanger 28b. Thus, the temperature of the heat medium supplied to the second heat exchanger 22 can be raised or maintained.

As described above, in the third heat exchanger 28b of the second embodiment, the heat medium heated by the second heat exchanger 22 can be preheated and a heating load of the heat medium can be reduced in the second heat exchanger 22. As described above, this configuration is effective in the case that the exhaust heat from the exhaust heat source 40 outside the system is higher in temperature than the heat medium supplied to the second heat exchanger 22.

Third Embodiment

Figure 3:
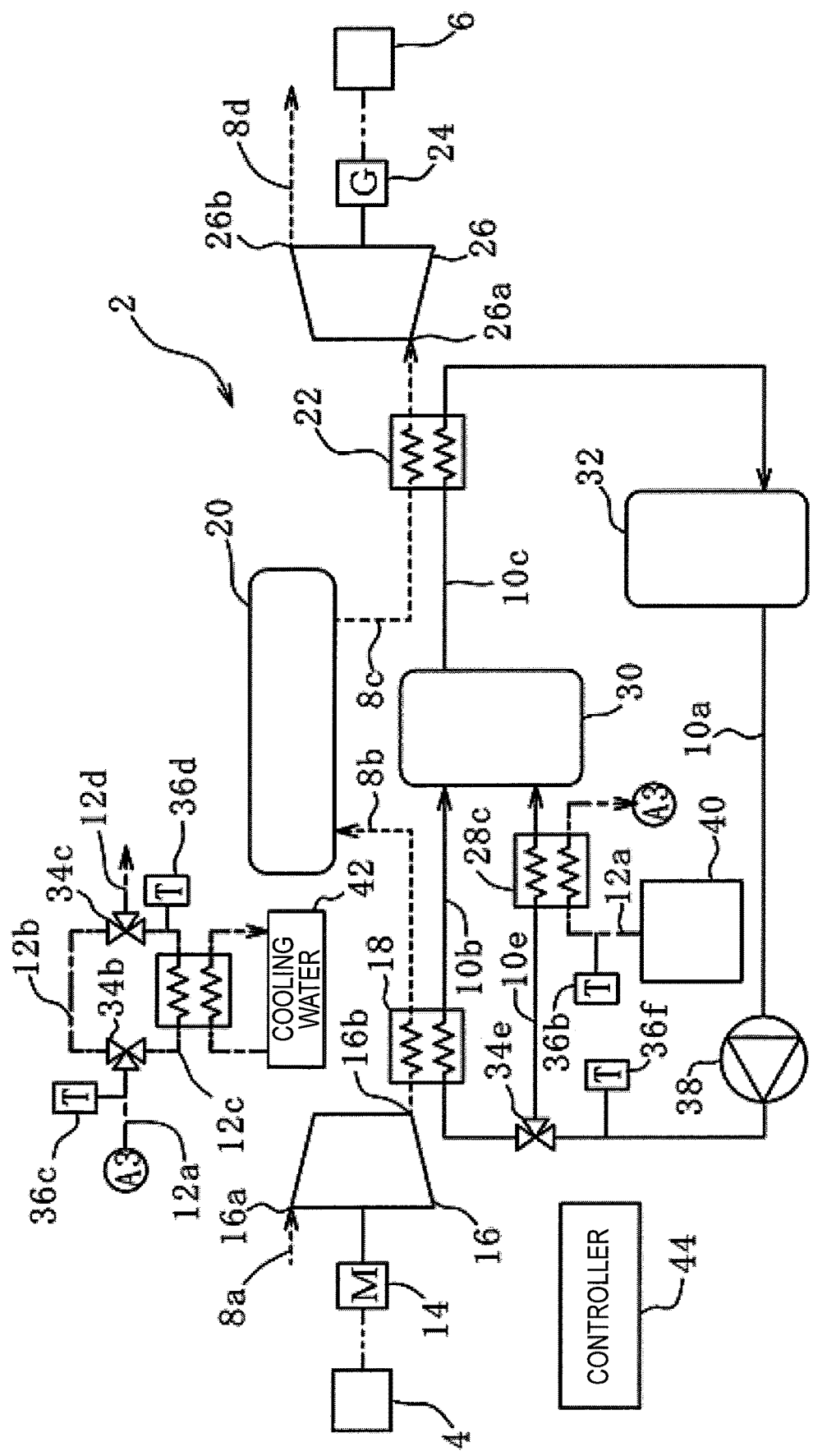
FIG. 3 is a schematic configuration diagram illustrating a compressed air energy storage power generation apparatus according to a third embodiment of the present invention.

In a CAES power generation apparatus 2 according to a third embodiment in FIG. 3, disposition of a third heat exchanger 28c is changed. The second embodiment is substantially similar to the first embodiment in FIG. 1 except for this point. Thus, the description of the component similar to that in FIG. 1 will be omitted.

In the third embodiment, a heat medium passage 10e is branched from the heat medium passage 10a extending from the low-temperature heat accumulating tank 32 to the first heat exchanger 18. A three-way valve 34e is provided at the branch point, and one of the heat medium passages 10a, 10e through which the heat medium flows can be selected by the three-way valve 34e. The branched heat medium passage 10e is fluidly connected to the high-temperature heat accumulating tank 30.

The temperature sensor 36c that measures the temperature of the heat medium is provided in the heat medium passage 10a extending from the low-temperature heat accumulating tank 32 to the three-way valve 34e. The temperature of the heat medium measured by the temperature sensor 36e is output to the controller 44.

The third heat exchanger 28c is interposed in the heat medium passage 10e. In the third heat exchanger 28c, the heat exchange is performed between the heat medium in the heat medium passage 10e and the gas in the exhaust heat passage 12a. Specifically, the heat medium in the heat medium passage is heated using the high-temperature gas in the exhaust heat passage 12a, the heat medium being supplied to the high-temperature heat accumulating tank 30. That is, in the third heat exchanger 28c, the temperature of the gas falls and the temperature of the heat medium rises.

In the case that the temperature Tg1 of the gas (exhaust heat) measured by the temperature sensor 36b is higher than a temperature Th3 of the heat medium measured by a temperature sensor 36f, the controller 44 controls the three-way valve 34e, causes the heat medium to flow in the heat medium passage 10e, and performs the heat exchange using the third heat exchanger 28c. In the case that the temperature Tg1 of the gas is lower than or equal to the temperature Th3 of the heat medium, the controller 44 controls the three-way valve 34e, does not cause the heat medium to flow in the heat medium passage 10e, and does not perform the heat exchange using the third heat exchanger 28c. Thus, the temperature of the heat medium supplied to the high-temperature heat accumulating tank 30 can be raised or maintained.

In the third heat exchanger 28c of the third embodiment, the heat medium supplied to the high-temperature heat accumulating tank 30 can be heated in parallel with the heating of the heat medium by the first heat exchanger 18, and the more heat medium can be stored in the high-temperature heat accumulating tank 30. As described above, this configuration is effective in the case that the exhaust heat from the exhaust heat source 40 outside the system is higher in temperature than the heat medium supplied to the first heat exchanger 18.

Fourth Embodiment

Figure 4:
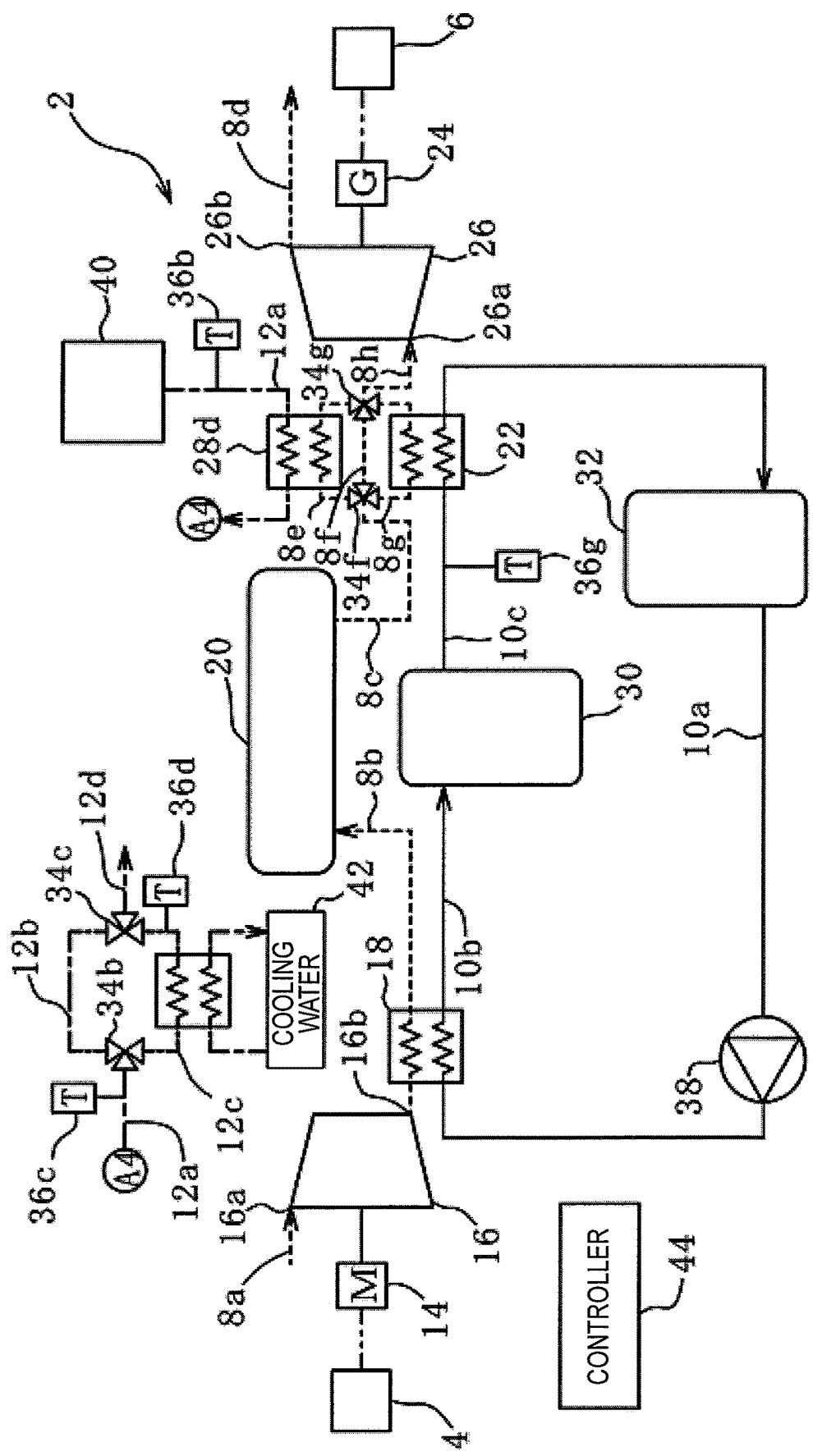
FIG. 4 is a schematic configuration diagram illustrating a compressed air energy storage power generation apparatus according to a fourth embodiment of the present invention.

In a CAES power generation apparatus 2 according to a fourth embodiment in FIG. 4, disposition of a third heat exchanger 28d is changed. The second embodiment is substantially similar to the first embodiment in FIG. 1 except for this point. Thus, the description of the component similar to that in FIG. 1 will be omitted.

In the fourth embodiment, the air passage 8c extending from the pressure accumulating tank 20 to the expander 26 is branched into three air passages 8e to 8g. A three-way valve 34f is provided at the branch point, and one of the air flow passages 8e to 8g through which the compressed air flows can be selected by the three-way valve 34f. The branched air passages 8e to 8g merge in an air passage 8h through a three-way valve 34g. The merged air passage 8h is fluidly connected to the air supply port 26a of the expander 26.

A temperature sensor 36g that measures the temperature of the heat medium is provided in the heat medium passage 10c extending from the high-temperature heat accumulating tank 30 to the second heat exchanger 22. The temperature of the heat medium measured by the temperature sensor 36e is output to the controller 44.

Among the three air passages 8e to 8g, the second heat exchanger 22 is interposed in the air passage 8g, and the third heat exchanger 28d is provided in the air passage 8e. In the second heat exchanger 22, the compressed air is heated by the heat medium similarly to the first embodiment. In the third heat exchanger 28d, the heat exchange is performed between the compressed air in the air passage 8ec and the gas in the exhaust heat passage 12a. Specifically, the compressed air in the air passage 8e is heated using high-temperature gas in the exhaust heat passage 12a, the compressed air being supplied to the expander 26. That is, in the third heat exchanger 28d, the temperature of the gas falls and the temperature of the compressed air rises.

In the case that the temperature Tg1 of the gas (exhaust heat) measured by the temperature sensor 36b is higher than a temperature Th4 of the heat medium measured by the temperature sensor 36g, the controller 44 controls the three-way valves 34f, 34g, causes the compressed air to sequentially flow in the air passages 8c, 8g, 8f, 8e, 8h, namely, heats the compressed air using the second heat exchanger 22, and then further heats the compressed air using the third heat exchanger 28d. In the case that the temperature Tg1 of the gas is lower than or equal to a temperature Th4 of the heat medium, the controller 44 controls the three-way valves 34f, 34g, causes the compressed air to sequentially flow in the air passages 8c, 8e, 8f, 8g, 8h, namely, heats the compressed air using the third heat exchanger 28d, and then further heats the compressed air using the second heat exchanger 22. Thus, the temperature of the heat medium supplied to the expander 26 by both the second heat exchanger 22 and the third heat exchanger 28d can be raised or maintained.

In the third heat exchanger 28d of the fourth embodiment, the compressed air before expansion can directly be heated using the exhaust heat with no use of the heat medium or the like. As described above, this configuration is effective in the case that the exhaust heat from the exhaust heat source 40 outside the system is higher in temperature than the compressed air supplied to the expander 26.

Fifth Embodiment

Figure 5:
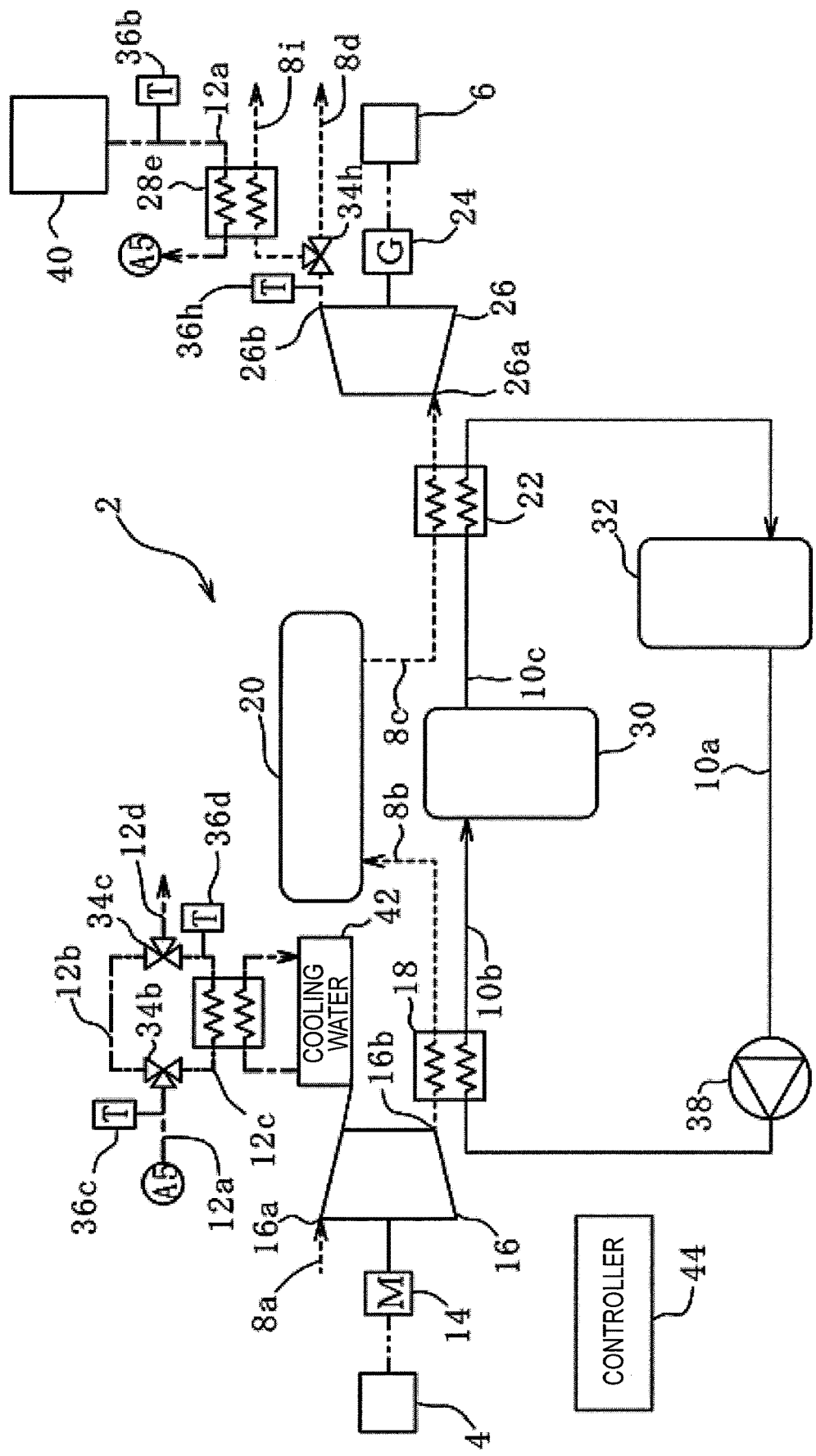
FIG. 5 is a schematic configuration diagram illustrating a compressed air energy storage power generation apparatus according to a fifth embodiment of the present invention.

In a CAES power generation apparatus 2 according to a fifth embodiment in FIG. 5, disposition of a third heat exchanger 28e is changed. The second embodiment is substantially similar to the first embodiment in FIG. 1 except for this point. Thus, the description of the component similar to that in FIG. 1 will be omitted.

In the fifth embodiment, an air passage 8i is branched from the air passage 8d extending from the exhaust port 26b of the expander 26. A three-way valve 34h is provided at the branching point, and one of the air passages 8d, 8i through which the air flows can be selected by the three-way valve 34h. The branched air passage 8i communicates with the outside air.

A temperature sensor 36h that measures the temperature of the air is provided in the air passage 8d extending from the expander 26 to the three-way valve 34h. The temperature of the air measured by the temperature sensor 36h is output to the controller 44.

The third heat exchanger 28e is interposed in the air passage 8i. In the third heat exchanger 28e, the heat exchange is performed between the air in the air passage 8i and the gas in the exhaust heat passage 12a. Specifically, the temperature of the air exhausted from the expander 26 is lowered due to heat absorption during the expansion, and the high-temperature gas in the exhaust heat passage 12a is cooled by using the cold heat. That is, in the third heat exchanger 28e, the temperature of the gas falls and the temperature of the air rises.

In the case that the temperature Tg1 of the gas (exhaust heat) measured by the temperature sensor 36b is higher than a temperature Ta1 of the air measured by the temperature sensor 36h, the controller 44 controls the three-way valve 34h, passes the air in the air passage 8i, and performs the heat exchange using the third heat exchanger 28e. In the case that the temperature Tg1 of the gas is lower than or equal to the temperature Ta1 of the air, the controller 44 controls the three-way valve 34h, does not cause the air to flow in the air passage 8i, and does not perform the heat exchange using the third heat exchanger 28e. Thus, the temperature of the gas discharged from the exhaust heat source 40 can be lowered or maintained.

In the third heat exchanger 28e of the fifth embodiment, the exhaust heat of the exhaust heat source 40 outside the system can be cooled using the cold heat of the air exhausted from the expander 26. As described above, the temperature of the air exhausted from the expander 26 is lowered due to the heat absorption during the expansion, and the energy efficiency of the system can be improved by effectively utilizing the cold heat of the exhaust air.

Sixth Embodiment

Figure 6:
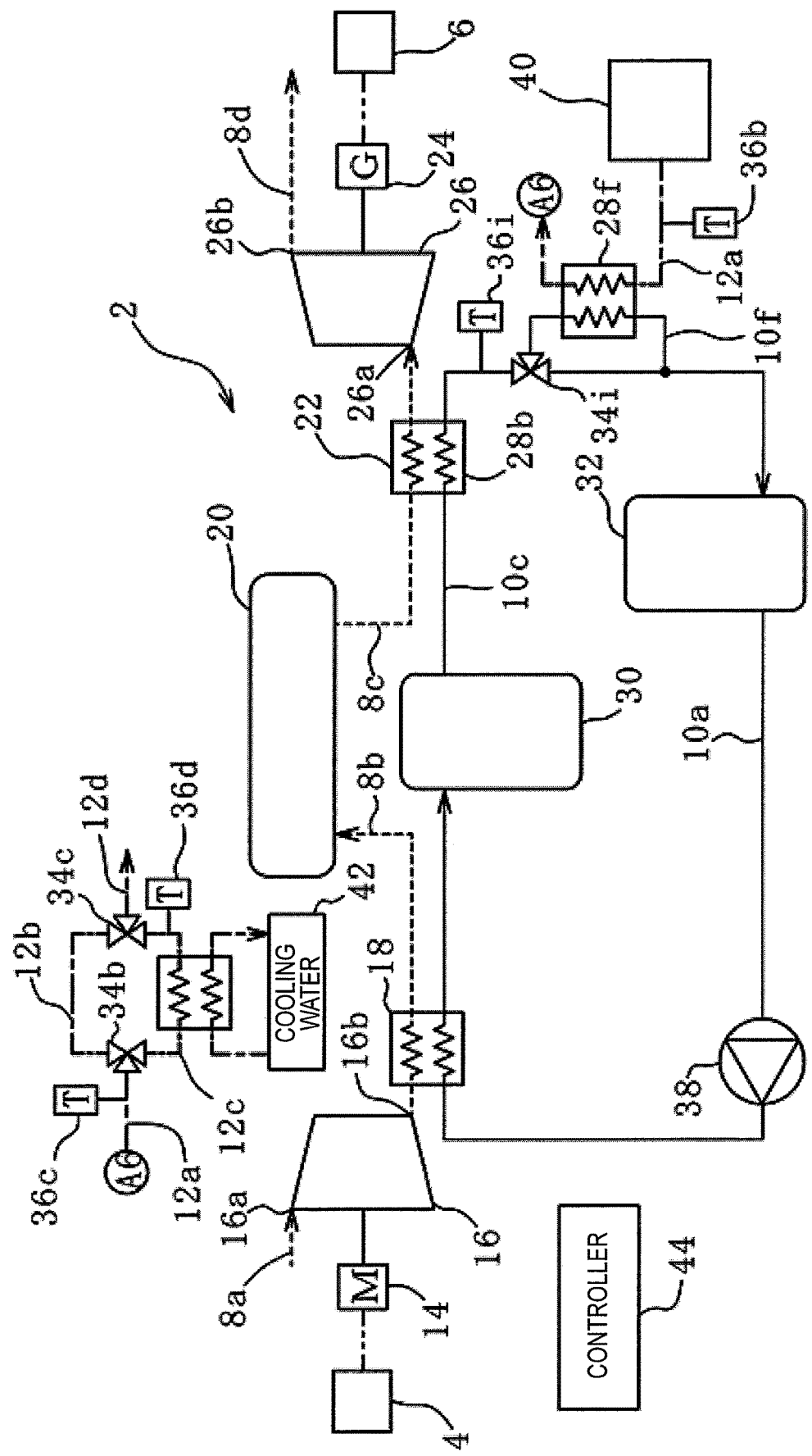
FIG. 6 is a schematic configuration diagram illustrating a compressed air energy storage power generation apparatus according to a sixth embodiment of the present invention.

In a CAES power generation apparatus 2 according to a sixth embodiment in FIG. 6, disposition of a third heat exchanger 28f is changed. The second embodiment is substantially similar to the first embodiment in FIG. 1 except for this point. Thus, the description of the component similar to that in FIG. 1 will be omitted.

In the sixth embodiment, a heat medium passage 10f is branched from the heat medium passage 10c extending from the first heat exchanger 18 to the low-temperature heat accumulating tank 32. A three-way valve 34i is provided at the branch point, and one of the heat medium passages 10c, 10f through which the heat medium flows can be selected by the three-way valve 34i. The branched heat medium passage 10f merges in the heat medium passage 10c on the upstream side of the low-temperature heat accumulating tank 32.

A temperature sensor 36i that measures the temperature of the heat medium is provided in the heat medium passage 10c extending from the second heat exchanger 22 to the three-way valve 34i. The temperature of the heat medium measured by the temperature sensor 36e is output to the controller 44.

The third heat exchanger 28f is interposed in the heat medium passage 10f. In the third heat exchanger 28f, the heat exchange is performed between the heat medium in the heat medium passage 10f and the gas in the exhaust heat passage 12a. Specifically, the high-temperature gas in the exhaust heat passage 12a is cooled using the heat medium in the heat medium passage 10f, the heat medium being cooled by the second heat exchanger 22. That is, in the third heat exchanger 28f, the temperature of the gas falls and the temperature of the heat medium rises.

In the case that the temperature Tg1 of the gas (exhaust heat) measured by the temperature sensor 36b is higher than a temperature Th5 of the heat medium measured by the temperature sensor 36b, the controller 44 controls the three-way valve 34i, causes the heat medium to flow in the heat medium passage 10f, and performs the heat exchange using the third heat exchanger 28f. In the case that the temperature Tg1 of the gas is lower than or equal to the temperature Th5 of the heat medium, the controller 44 controls the three-way valve 34i, does not cause the heat medium to flow in the heat medium passage 10f, and does not perform the heat exchange using the third heat exchanger 28f. Thus, the temperature of the gas discharged from the exhaust heat source 40 can be lowered or maintained.

As described above, in the third heat exchanger 28f of the present embodiment, the exhaust heat from the exhaust heat source 40 outside the system can be cooled using the heat medium cooled by the second heat exchanger. Additionally, the energy efficiency of the system can be improved by effectively using the heat medium cooled by the second heat exchanger.

Among the first to sixth embodiments, the first to fourth embodiments are mainly aimed at recovering the exhaust heat from the exhaust heat source 40 to improve the power generation efficiency of the CAES power generation apparatus 2. The fifth and sixth embodiments are mainly aimed at cooling the exhaust heat from the exhaust heat source 40 to make the temperature of the exhaust heat lower than or equal to the exhaust heat reference temperature. These embodiments may be implemented by a combination thereof, and FIG. 7 illustrates a configuration of a CAES power generation apparatus 2 according to a seventh embodiment in which the first to sixth embodiments are combined.

Seventh Embodiment

Figure 7:
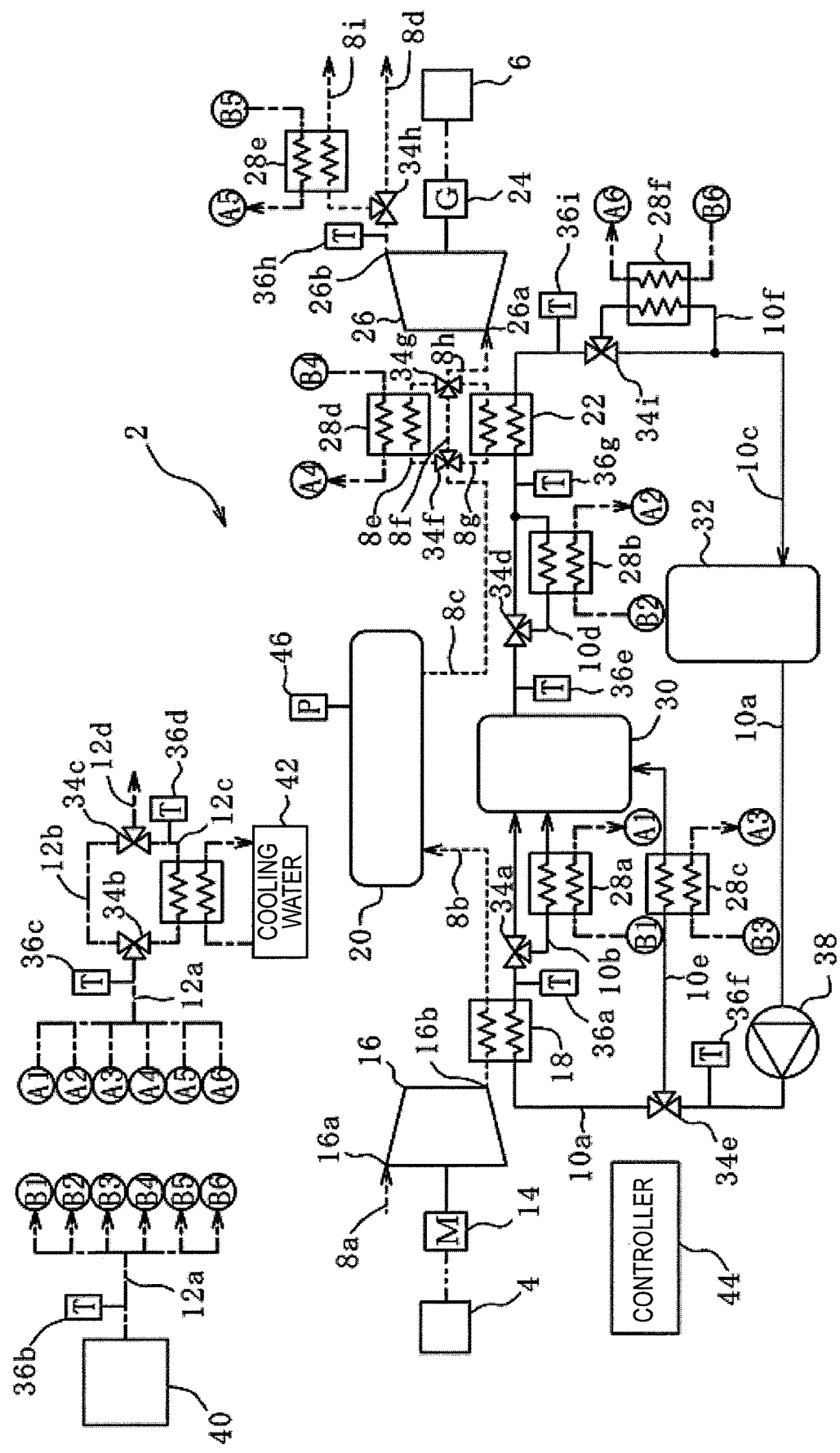
FIG. 7 is a schematic configuration diagram illustrating a compressed air energy storage power generation apparatus according to a seventh embodiment of the present invention.

The CAES power generation apparatus 2 of the seventh embodiment in FIG. 7 is the combination of the first to sixth embodiments. Thus, a configuration of the CAES power generation apparatus 2 of the seventh embodiment is substantially similar to the configuration in FIGS. 1 to 6, so that the description will be omitted. However, in the seventh embodiment, a pressure sensor 46 that measures the pressure in the pressure accumulating tank 20 is provided in the pressure accumulating tank 20.

Figure 8A:
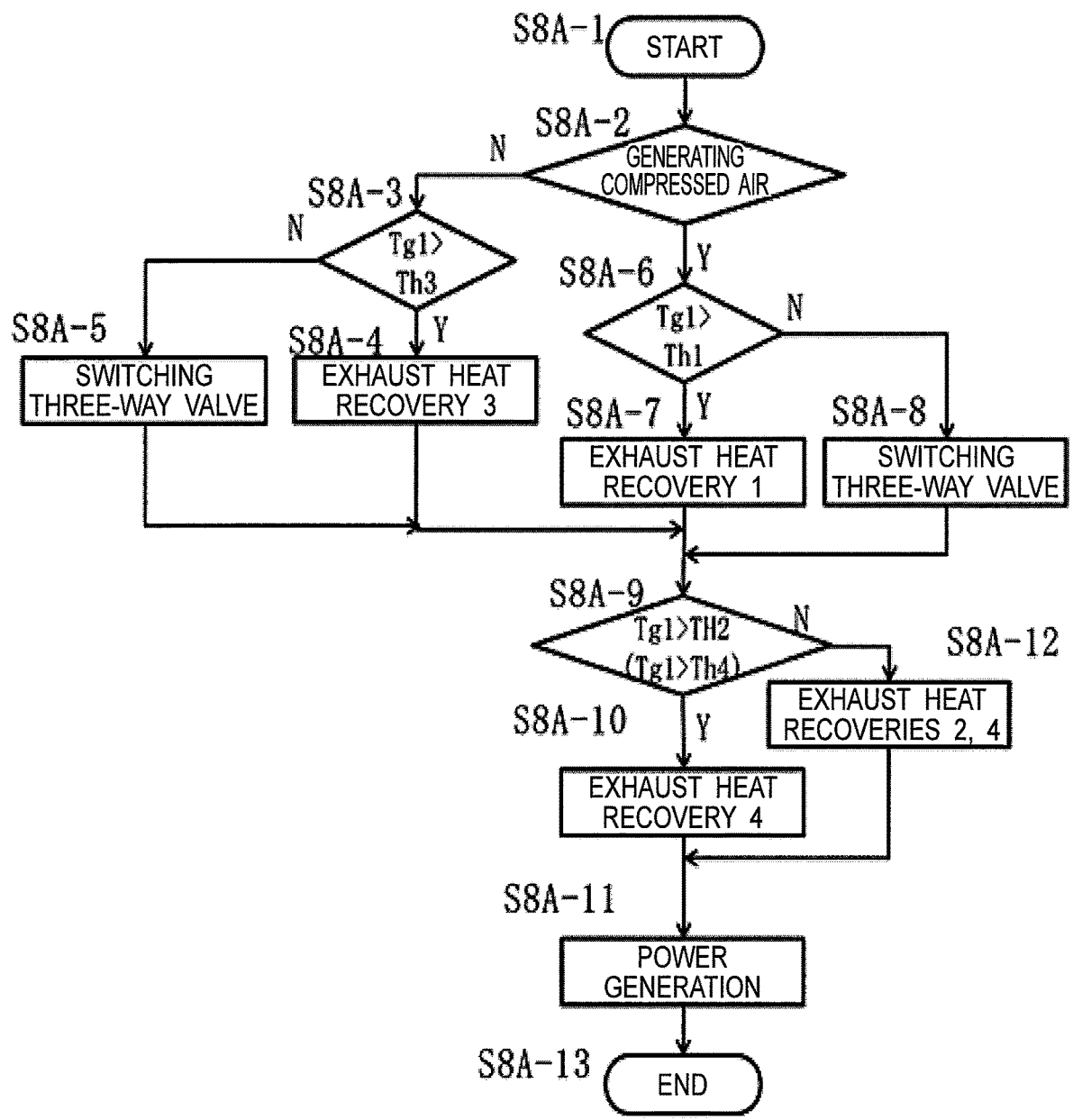
FIG. 8A is a flowchart illustrating a method for controlling the compressed air energy storage power generation apparatus in FIG. 7.
Figure 8B:
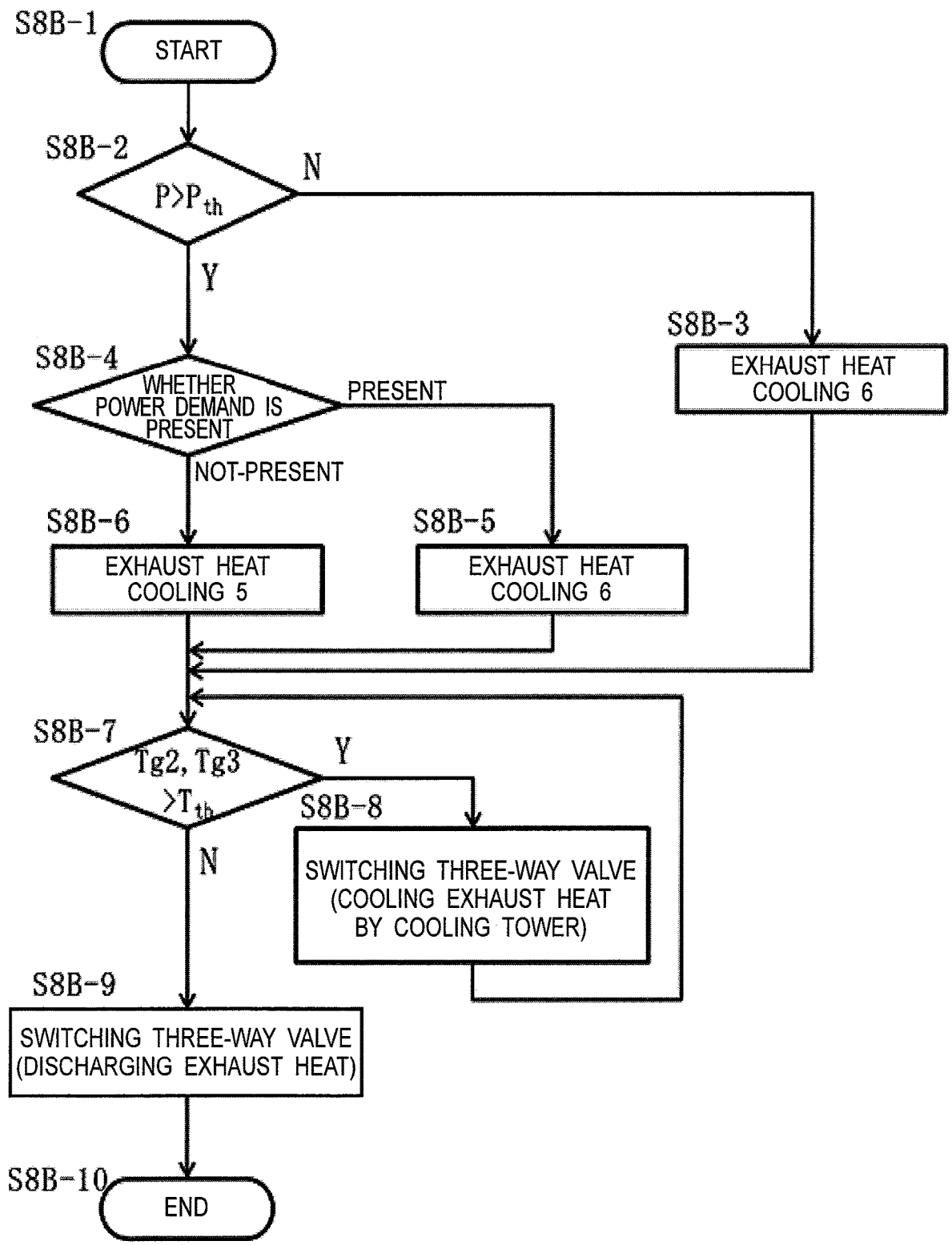
FIG. 8B is a flowchart illustrating a method for controlling the compressed air energy storage power generation apparatus in FIG. 7.

FIGS. 8A and 8B illustrate a control method of the seventh embodiment. FIG. 8A illustrates the control method for recovering and utilizing the exhaust heat from the exhaust heat source 40 outside the system as in the first to fourth embodiments. FIG. 8B illustrates the control method for cooling the exhaust heat from the exhaust heat source 40 outside the system as in the fifth and sixth embodiments. These processes are performed in parallel.

As illustrated in FIG. 8A, when control of exhaust heat recovery is started (step S8A-1), whether the compressed air is being manufactured is determined (step S8A-2).

When the compressed air is not manufactured, whether the temperature Tg1 of the gas (exhaust heat) measured by the temperature sensor 36b is higher than the temperature Th3 of the heat medium measured by the temperature sensor 36f is determined (step S8A-3). When the temperature Tg1 of the gas is higher than the temperature Th3 of the heat medium, a process of exhaust heat recovery 3 is performed (step S8A-4). Otherwise, the heat medium passage 10e is closed by switching the three-way valve 34e, and the heat medium passage 10a toward the first heat exchanger 18 is opened (step S8A-5). After these processes are performed, the process proceeds to a process in step S8A-9 to be described later. At this point, the process of the exhaust heat recovery 3 indicates the exhaust heat recovery process in the third heat exchanger 28c of the third embodiment.

In the case that the compressed air is manufactured, whether the temperature Tg1 of the gas measured by the temperature sensor 36b is higher than the temperature Th1 of the heat medium measured by the temperature sensor 36a is determined (step S8A-6). When the temperature Tg1 of the gas is higher than the temperature Th1 of the heat medium, the process of exhaust heat recovery 1 is performed (step S8A-7). Otherwise, the heat medium passage 10b is closed by switching the three-way valve 34a, and the heat medium passage 10a toward the heat accumulating tank 30 is opened (step S8A-8). After these processes are performed, the process proceeds to a process in step S8A-9 to be described later. At this point, the process of the exhaust heat recovery 1 indicates the exhaust heat recovery process in the third heat exchanger 28a of the first embodiment.

Subsequently, whether the temperature Tg1 of the gas measured by the temperature sensor 36b is higher than the temperature Th2 of the heat medium measured by the temperature sensor 36e is determined, and whether the temperature Tg1 of the gas is higher than the temperature Th4 of the heat medium measured by the temperature sensor 36g is determined (step S8A-9). When the temperature Tg1 of the gas is higher than the temperature Th2 of the heat medium, the generator 24 generates the power (step S8A-11) after the process of exhaust heat recovery 4 is performed (step S8A-10). Otherwise, the power is generated (step S8A-11) after the processes of the exhaust heat recoveries 2, 4 are performed (step S8A-12). At this point, the processes of the exhaust heat recoveries 2, 4 indicate the exhaust heat recovery processes in the third heat exchangers 28b, 28d of the second and fourth embodiments. However, as described in the fourth embodiment, the process of the exhaust heat recovery 4 varies depending on whether the temperature Tg1 of the gas is higher than the temperature Th4 of the heat medium, so that the process is performed based on the value determined in step S8A-9. After these processes are completed, the control of the exhaust heat recovery is ended (step S8A-13).

As illustrated in FIG. 8B, when the control of exhaust heat cooling is started (step S8B-1), whether a pressure P in the pressure accumulating tank 20 measured by the pressure sensor 46 is larger than a setting value Pth (step S8B-2). When the pressure P is smaller than or equal to the setting value Pth, the process of exhaust heat cooling 6 is performed (step S8B-3), and the process proceeds to a process in step S8B-7 to be described later. When the pressure P is larger than the setting value Pth, whether a power demand is present is determined (step S8B-4). When the power demand is present, the process of exhaust heat cooling 6 is performed (step S8B-5). When the power demand is absent, the process of exhaust heat cooling 5 is performed (step S8B-6). At this point, the processes of the exhaust heat coolings 5, 6 indicate the exhaust heat cooling processes in the third heat exchangers 28e, 28f of the fifth and sixth embodiments. After these processes are completed, the process proceeds to a process in step S8B-7 to be described later.

Subsequently, whether the temperature Tg2 of the gas measured by the temperature sensor 36c is higher than the exhaust heat reference temperature Tth is determined (step S8B-7). When the temperature Tg2 of the gas is higher than the exhaust heat reference temperature Tth, the three-way valve 34b is controlled such that the gas flows in the exhaust heat passage 12c and the gas is cooled by the cooling tower 42 (step S8B-8). Whether the temperature Tg3 of the gas measured by the temperature sensor 36d is higher than the exhaust heat reference temperature Tth is determined after the cooling (step S8B-7). When the temperature Tg3 of the gas is still high, the three-way valves 34b, 34c are controlled such that the gas repeatedly flows in the exhaust heat passages 12b, 12c, and the gas is cooled by the cooling tower 42 until the temperature Tg3 of the gas becomes lower than or equal to the exhaust heat reference temperature Tth (step S8B-8). When the temperature Tg3 of the gas measured by the temperature sensor 36d is lower than or equal to the exhaust heat reference temperature Tth, the three-way valve 34c is controlled such that the gas is discharged through the exhaust heat passage 12d (step S8B-9). When the temperature Tg2 of the gas measured by the temperature sensor 36c is lower than or equal to the exhaust heat reference temperature Tth, the gas is passed through the exhaust heat passages 12b, 12c, and the gas is discharged without cooling the gas using the cooling tower 42 (step S8B-9). After these processes are completed, the control of the exhaust heat recovery is ended (step S8B-10).

A temperature of a heat exchange target is always monitored by performing the control in this way, and the exhaust heat from the exhaust heat source 40 outside the system is prevented from being heated or the heat medium or the compressed air is prevented from being cooled. Further, sometimes unstable operation may be performed because the renewable energy is used in the CAES power generation apparatus 2. However, the cooling of the exhaust heat and the heating of the heat medium or the compressed air can stably be performed according to any operating condition by performing various processes such as the processes of the exhaust heat recoveries 1 to 4 and the processes of the exhaust heat coolings 5, 6.

Eighth Embodiment

Figure 9A:
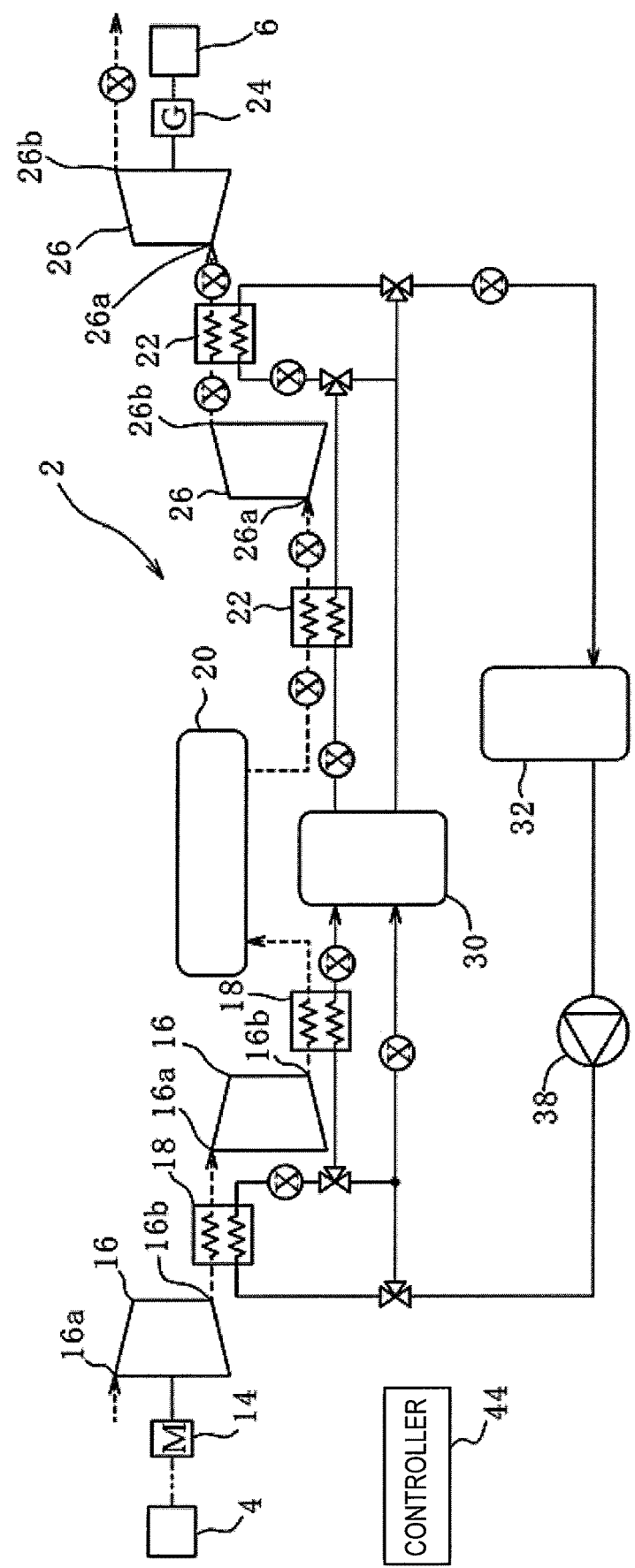
FIG. 9A is a schematic configuration diagram illustrating a compressed air energy storage power generation apparatus according to an eighth embodiment of the present invention.
Figure 9B:
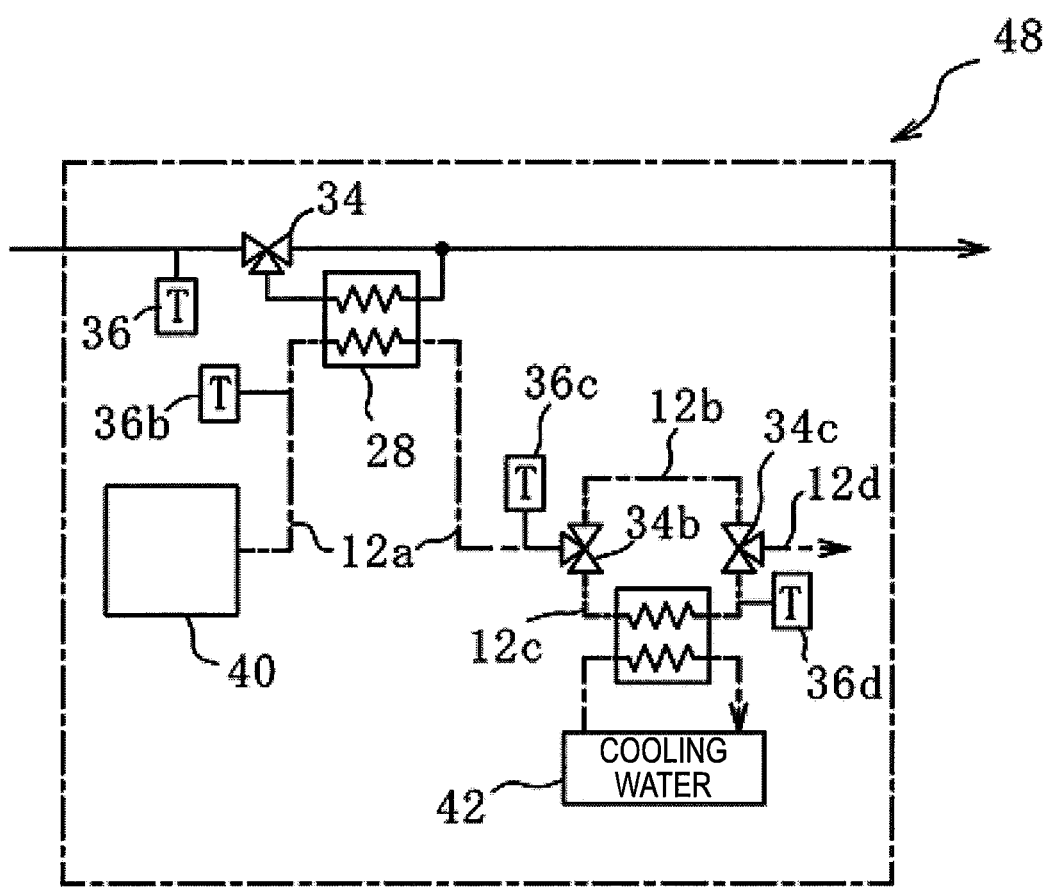
FIG. 9B is a schematic configuration diagram illustrating the compressed air energy storage power generation apparatus of the eighth embodiment of the present invention.

In a CAES power generation apparatus 2 according to an eighth embodiment shown in FIGS. 9A and 9B, both the compressor 16 and the expander 26 are replaced with two-stage types. The eighth embodiment is substantially similar to the seventh embodiment in FIG. 7 except for this point. Thus, the description of the component similar to that in FIG. 7 will be omitted.

In the eighth embodiment, an exhaust heat recovery (cooling) mechanism 48 including a third heat exchanger 28 in FIG. 9B is provided at a position of a point X in FIG. 9A. Because the compressor 16 and the expander 26 of the eighth embodiment are the two-stage type, the exhaust heat recovery (cooling) is also performed in an intermediate stage, and the larger number of the exhaust heat recovery (cooling) mechanisms 48 is provided in the eighth embodiment than that in the seventh embodiment.

The method for controlling the CAES power generation apparatus 2 of the eighth embodiment is substantially similar to that of the seventh embodiment.

As described above, the present invention can be applied even if the compressor 16 or the expander 26 is a single-stage type, a two-stage type, or a three-stage type or more.

In each of the embodiments described above, the target of power generation by the renewable energy can be applied to all the things, which are regularly (or repeatedly) replenished by natural force such as wind power, sunlight, solar heat, wave force or tidal power, running water or a tide, and geothermal heat and utilizes irregularly fluctuating energy. The target of power generation by the renewable energy can also be applied to the things in which the power may be varied depending on a facility that consumes other large power in a factory.

The invention claimed is:

1. A compressed air energy storage power generation apparatus comprising:
an electric motor driven by power generated by renewable energy;
a compressor driven by the electric motor to compress air;
a pressure accumulator that stores the compressed air compressed by the compressor;
an expander driven by the compressed air supplied from the accumulator;
a generator mechanically connected to the expander;
a first heat exchanger that performs heat exchange only between the compressed air supplied from the compressor to the pressure accumulator and a heat medium, cools the compressed air, and heats the heat medium;
a heat accumulator that stores the heat medium heated by the first heat exchanger;
a second heat exchanger that performs heat exchange only between the compressed air supplied from the pressure accumulator to the expander and the heat medium supplied from the heat accumulator, heats the compressed air, and cools the heat medium, the second heat exchanger being directly connected to the expander via an air passage;
a third heat exchanger that performs heat exchange between exhaust heat outside a system and the heat medium supplied from the first heat exchanger to the heat accumulator, cools the exhaust heat, and heats the heat medium;
an exhaust heat passage extending from an exhaust heat source through the third heat exchanger;
a first heat medium passage extending from the first heat exchanger to the heat accumulator without passing through the third heat exchanger;
a second heat medium passage extending from the first heat exchanger to the heat accumulator through the third heat exchanger;
a three way valve which selectively opens and closes the first heat medium passage or the second heat medium passage;
a heat medium temperature sensor which measures a temperature of the heat medium flowing into the three way valve;
an exhaust heat temperature sensor which measures a temperature of a gas flowing through the exhaust heat passage into the third heat exchanger; and
a controller configured to control the three-way valve so as to cause the heat medium to flow in the second heat medium passage and perform heat exchange using the third heat exchanger when the temperature measured by the exhaust heat temperature sensor is higher than the temperature measured by the heat medium temperature sensor.

2. A compressed air energy storage power generation apparatus comprising:
an electric motor driven by power generated by renewable energy;
a compressor driven by the electric motor to compress air;
a pressure accumulator that stores the compressed air compressed by the compressor;
an expander driven by the compressed air supplied from the accumulator;
a generator mechanically connected to the expander;
a first heat exchanger that performs heat exchange only between the compressed air supplied from the compressor to the pressure accumulator and a heat medium, cools the compressed air, and heats the heat medium;
a heat accumulator that stores the heat medium heated by the first heat exchanger;
a second heat exchanger that performs heat exchange only between the compressed air supplied from the pressure accumulator to the expander and the heat medium supplied from the heat accumulator, heats the compressed air, and cools the heat medium, the second heat exchanger being directly connected to the expander via an air passage;
a third heat exchanger that performs heat exchange between exhaust heat outside a system and the heat medium supplied from the heat accumulator to the second heat exchanger, cools the exhaust heat, and heats the heat medium;

an exhaust heat passage extending from an exhaust heat source through the third heat exchanger;
a first heat medium passage extending from the heat accumulator to the second heat exchanger without passing through the third heat exchanger;
a second heat medium passage extending from the heat accumulator to the second heat exchanger through the third heat exchanger;
a three way valve which selectively opens and closes the first heat medium passage or the second heat medium passage;
a heat medium temperature sensor which measures a temperature of the heat medium flowing into the three way valve;
an exhaust heat temperature sensor which measures a temperature of a gas flowing through the exhaust heat passage into the third heat exchanger; and
a controller configured to control the three-way valve so as to cause the heat medium to flow in the second heat medium passage and perform heat exchange using the third heat exchanger when the temperature measured by the exhaust heat temperature sensor is higher than the temperature measured by the heat medium temperature sensor.

3. A compressed air energy storage power generation apparatus comprising:
an electric motor driven by power generated by renewable energy;
a compressor driven by the electric motor to compress air;
a pressure accumulator that stores the compressed air compressed by the compressor;
an expander driven by the compressed air supplied from the accumulator;
a generator mechanically connected to the expander;
a first heat exchanger that performs heat exchange only between the compressed air supplied from the compressor to the pressure accumulator and a heat medium, cools the compressed air, and heats the heat medium;
a heat accumulator that stores the heat medium heated by the first heat exchanger;
a second heat exchanger that performs heat exchange only between the compressed air supplied from the pressure accumulator to the expander and the heat medium supplied from the heat accumulator, heats the compressed air, and cools the heat medium, the second heat exchanger being directly connected to the expander via an air passage;
a third heat exchanger that performs heat exchange between exhaust heat outside a system and the heat medium supplied to the heat accumulator without passing through the first heat exchanger, cools the exhaust heat outside the system, and heats the heat medium;
an exhaust heat passage extending from an exhaust heat source through the third heat exchanger;
a first heat medium passage extending to the heat accumulator without passing through the third heat exchanger;
a second heat medium passage extending to the heat accumulator through the third heat exchanger;
a three way valve which selectively opens and closes the first heat medium passage or the second heat medium passage;
a heat medium temperature sensor which measures a temperature of the heat medium flowing into the three way valve;
an exhaust heat temperature sensor which measures a temperature of a gas flowing through the exhaust heat passage into the third heat exchanger; and
a controller configured to control the three-way valve so as to cause the heat medium to flow in the second heat medium passage and perform heat exchange using the third heat exchanger when the temperature measured by the exhaust heat temperature sensor is higher than the temperature measured by the heat medium temperature sensor.

4. A compressed air energy storage power generation apparatus comprising:
an electric motor driven by power generated by renewable energy;
a compressor driven by the electric motor to compress air;
a pressure accumulator that stores the compressed air compressed by the compressor;
an expander driven by the compressed air supplied from the accumulator;
a generator mechanically connected to the expander;
a first heat exchanger that performs heat exchange only between the compressed air supplied from the compressor to the pressure accumulator and a heat medium, cools the compressed air, and heats the heat medium;
a heat accumulator that stores the heat medium heated by the first heat exchanger;
a second heat exchanger that performs heat exchange only between the compressed air supplied from the pressure accumulator to the expander and the heat medium supplied from the heat accumulator, heats the compressed air, and cools the heat medium, the second heat exchanger being directly connected to the expander via an air passage;
a third heat exchanger that performs heat exchange between exhaust heat outside a system and the heat medium supplied from the second heat exchanger, cools the exhaust heat outside the system, and heats the heat medium;
an exhaust heat passage extending from an exhaust heat source through the third heat exchanger;
a first heat medium passage extending from the second heat exchanger without passing through the third heat exchanger;
a second heat medium passage extending from the second heat exchanger through the third heat exchanger;
a three way valve which selectively opens and closes the first heat medium passage or the second heat medium passage;
a heat medium temperature sensor which measures a temperature of the heat medium flowing into the three way valve;
an exhaust heat temperature sensor which measures a temperature of a gas flowing through the exhaust heat passage into the third heat exchanger; and
a controller configured to control the three-way valve so as to cause the heat medium to flow in the second heat medium passage and perform heat exchange using the third heat exchanger when the temperature measured by the exhaust heat temperature sensor is higher than the temperature measured by the heat medium temperature sensor.

\* \* \* \* \*